United States Patent
Hwang et al.

(10) Patent No.: US 11,736,838 B2
(45) Date of Patent: Aug. 22, 2023

(54) SECURE PASSIVE WIRELESS SENSOR AND RELATED METHODS

(71) Applicant: Analog Devices, Inc., Wilmington, MA (US)

(72) Inventors: Eugene Oh Hwang, Wilmington, MA (US); Tao Yu, Wilmington, MA (US); Tze Lei Poo, Wilmington, MA (US); Rui Zhang, Wilmington, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/395,907

(22) Filed: Aug. 6, 2021

(65) Prior Publication Data

US 2022/0046337 A1 Feb. 10, 2022

Related U.S. Application Data

(60) Provisional application No. 63/063,184, filed on Aug. 7, 2020.

(51) Int. Cl.
*H04Q 9/00* (2006.01)
(52) U.S. Cl.
CPC ........... *H04Q 9/00* (2013.01); *H04Q 2209/40* (2013.01); *H04Q 2209/75* (2013.01)
(58) Field of Classification Search
CPC ........... H04Q 2209/00; H04Q 2209/40; H04Q 2209/47; H04Q 2209/75; H04Q 2209/80; H04Q 2209/84; H04Q 9/00
See application file for complete search history.

(56) References Cited

U.S. PATENT DOCUMENTS

| 7,421,321 B2 | 9/2008 | Breed et al. |
| 7,444,210 B2 | 10/2008 | Breed et al. |

(Continued)

FOREIGN PATENT DOCUMENTS

| EP | 3 551 082 B1 | 9/2020 |
| WO | 2014/111920 A1 | 7/2014 |
| WO | 2019/086970 A1 | 5/2019 |

OTHER PUBLICATIONS

International Search Report and Written Opinion dated Nov. 2, 2021 in connection with International Application No. PCT/US21/44886.

(Continued)

*Primary Examiner* — Franklin D Balseca
(74) *Attorney, Agent, or Firm* — Wolf, Greenfield & Sacks, P.C.

(57) ABSTRACT

A passive wireless sensor may be wirelessly coupled with an interrogator. The sensor uses multiple antennas to receive an interrogation signal from the interrogator and compares a path length difference between the signal received at each antenna. The path length difference changes based on the relative position of the sensor and interrogator. Using the path length difference, the sensor transmits a response signal to the interrogator. The interrogator analyzes the response signal to determine sensor position. The interrogator compares the determined sensor position to a previous known sensor position to determine if an attack has occurred, such as a replay, counterfeit, or tampering attack. The sensor may include cryptographic circuitry that scrambles the response signal, thwarting an attack such as a sniffing attack. The interrogator may include multiple antennas and determine a position of the sensor by calculating an angle-of-arrival that enhances a signal from the sensor, via beamforming.

19 Claims, 15 Drawing Sheets

(56) References Cited

U.S. PATENT DOCUMENTS

| | | | |
|---|---|---|---|
| 7,527,288 B2 | 5/2009 | Breed | |
| 7,844,687 B1 | 11/2010 | Gelvin et al. | |
| 7,982,609 B2 * | 7/2011 | Padmanabhan | H04Q 9/00 340/572.8 |
| 8,014,789 B2 | 9/2011 | Breed | |
| 8,269,610 B2 * | 9/2012 | Fenkanyn | H04Q 9/00 340/10.3 |
| 8,344,869 B2 * | 1/2013 | Lickfelt | B60C 23/0452 340/447 |
| 9,477,857 B2 | 10/2016 | Youngquist et al. | |
| 9,801,542 B2 | 10/2017 | Tran et al. | |
| 9,835,501 B2 | 12/2017 | Zheng et al. | |
| 10,517,479 B2 | 12/2019 | Tran | |
| 10,677,934 B2 * | 6/2020 | Vella-Coleiro | G01S 19/55 |
| 10,733,116 B2 | 8/2020 | Litichever et al. | |
| 2003/0144010 A1 | 7/2003 | Dollinger | |
| 2007/0018805 A1 | 1/2007 | Dixon et al. | |
| 2008/0042803 A1 * | 2/2008 | Posamentier | G06K 7/0008 340/572.1 |
| 2008/0204332 A1 | 8/2008 | Ikeura | |
| 2009/0143923 A1 | 6/2009 | Breed | |
| 2009/0165546 A1 | 7/2009 | Cook et al. | |
| 2010/0250170 A1 | 9/2010 | Kalinin et al. | |
| 2018/0261084 A1 * | 9/2018 | Tsai | G01K 1/024 |
| 2018/0288016 A1 | 10/2018 | Stein et al. | |
| 2018/0343304 A1 | 11/2018 | Binder et al. | |
| 2020/0294401 A1 | 9/2020 | Kerecsen | |
| 2020/0314607 A1 | 10/2020 | Hwang et al. | |

OTHER PUBLICATIONS

[No Author Listed], Surface Acoustic Wave (SAW) Sensors. Sensor Technology—Metropolia Confluence, Jan. 5, 2014. https://wiki.metropolia.fi/display/sensor/Surface+acoustic+wave+%28SAW%29+sensors. [Last Access Aug. 21, 2021]. 11 pages.

El-Rewini et al., Cybersecurity Attacks in Vehicular Sensors. IEEE Sensors Journal. Apr. 2020; XX (XX): 16 pages.

International Preliminary Report on Patentability dated Feb. 16, 2023 in connection with International Application No. PCT/US2021/044886.

* cited by examiner

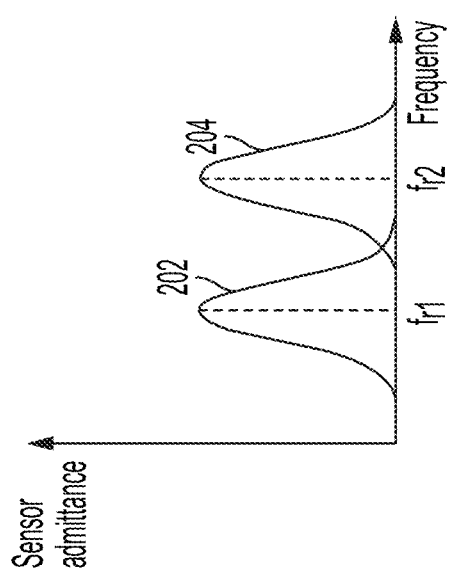
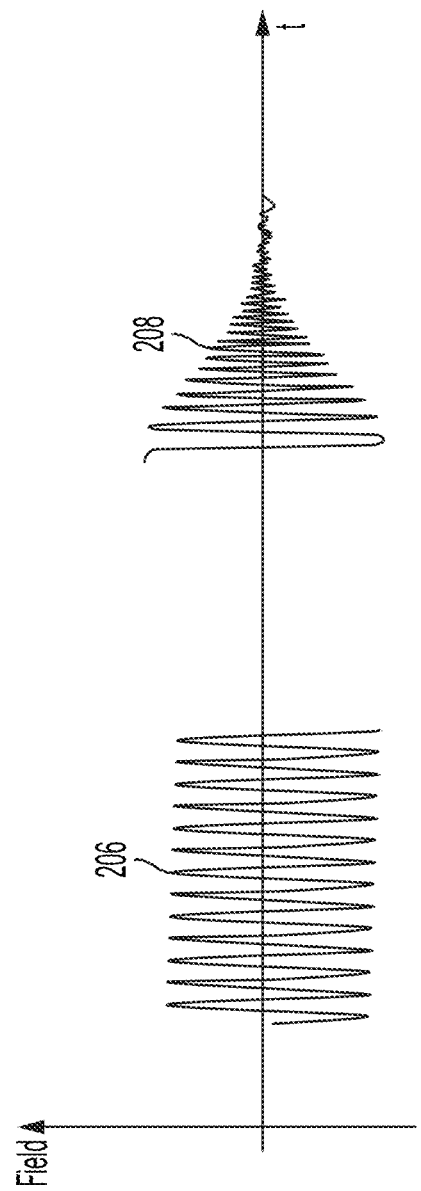
FIG. 2A
FIG. 2B

SECURE PASSIVE WIRELESS SENSOR AND RELATED METHODS

RELATED APPLICATIONS

This application claims the benefit under 35 USC 119(e) of U.S. Application Ser. No. 63/063,184, filed Aug. 7, 2020, and entitled "SECURE PASSIVE WIRELESS SENSOR AND RELATED METHODS", which is hereby incorporated herein by reference in its entirety.

FIELD OF THE DISCLOSURE

The technology described in the present disclosure relates to resonant passive wireless sensors.

BACKGROUND

Sensors may be deployed at remote locations to measure environmental or physical characteristics, such as temperature or pressure. Sensors may be coupled to an interrogator and transmit the measured characteristics to the interrogator.

SUMMARY OF THE DISCLOSURE

A passive wireless sensor may be wirelessly coupled with an interrogator. The sensor uses multiple antennas to receive an interrogation signal from the interrogator and compares a path length difference between the signal received at each antenna. The path length difference changes based on the relative position of the sensor and interrogator. Using the path length difference, the sensor transmits a response signal to the interrogator. The interrogator analyzes the response signal to determine sensor position. The interrogator compares the determined sensor position to a previous known sensor position to determine if an attack has occurred, such as a replay, counterfeit, or tampering attack. The sensor may include cryptographic circuitry that scrambles the response signal, thwarting an attack such as a sniffing attack. The interrogator may include multiple antennas and determine a position of the sensor by calculating an angle-of-arrival that enhances a signal from the sensor, via beamforming.

According to aspects of the disclosure, there is provided a passive wireless sensor configured to wirelessly couple with an interrogator. The passive wireless sensor comprises a first antenna, a second antenna, and passive circuitry. The passive circuitry is configured to receive, using the first antenna and the second antenna, at least one interrogation signal from the interrogator and transmit, based on the at least one interrogation signal, at least one response signal to the interrogator. The at least one response signal comprises position information associated with the passive wireless sensor.

In some embodiments, the passive circuitry configured to receive, using the first antenna and the second antenna, the at least one interrogation signal from the interrogator is configured to receive, using the first antenna, the at least one interrogation signal and receive, using the second antenna, the at least one interrogation signal. There is a path length difference between the at least one interrogation signal received using the first antenna and the at least one interrogation signal received using the second antenna.

In some embodiments, the passive circuitry is further configured to calculate the path length difference between the at least one interrogation signal received using the first antenna and the at least one interrogation signal received using the second antenna and determine whether the calculated path length difference exceeds a threshold path length difference.

In some embodiments, the passive circuitry configured to transmit, based on the at least one interrogation signal, the at least one response signal to the interrogator is configured to transmit, based the calculated path length difference, the at least one response signal.

In some embodiments, the passive circuitry configured to transmit, based the calculated path length difference, the at least one response signal is configured to in response to determining that the calculated path length difference does not exceed the threshold path length difference, transmit the at least one response signal comprising the position information, where the position information indicates that the passive wireless sensor has not moved more than a threshold amount and in response to determining that the calculated path length difference exceeds the threshold path length difference, transmit the at least one response signal comprising the position information, where the position information indicates that the passive wireless sensor has moved more than the threshold amount.

In some embodiments, the threshold amount comprises a threshold angle.

In some embodiments, the threshold angle is approximately 60 degrees.

In some embodiments, the first antenna is disposed approximately $5\lambda/8$ from the second antenna, where κ is a wavelength of the at least one interrogation signal.

According to aspects of the disclosure, there is provided a passive wireless sensing system. The system comprises a component, an interrogator, and a passive wireless sensor disposed at the component and configured to wirelessly couple with the interrogator. The passive wireless sensor comprises a first antenna, a second antenna, and passive circuitry. The passive circuitry is configured to receive, using the first antenna and the second antenna, at least one interrogation signal from the interrogator and transmit, based on the at least one interrogation signal, at least one response signal to the interrogator. The at least one response signal comprises position information associated with the passive wireless sensor.

In some embodiments, the interrogator comprises a third antenna, transmit circuitry configured to transmit, using the third antenna, the at least one interrogation signal to the passive wireless sensor, and receive circuitry. The receive circuitry is configured to receive, in response to the transmitting, the at least one response signal from the passive wireless sensor and using the response signal, determine position information associated with the passive wireless sensor.

In some embodiments, the system comprises a vehicle, and the component comprises a component of the vehicle.

In some embodiments, the passive wireless sensor is configured to measure characteristic information of the component and the passive circuitry configured to transmit, based on the at least one interrogation signal, the at least one response signal to the interrogator is configured to transmit the at least one response signal comprising the characteristic information of the component.

In some embodiments, the component comprises a tire and the characteristic information comprises at least one of pressure information or temperature information.

In some embodiments, the passive circuitry configured to receive, using the first antenna and the second antenna, the at least one interrogation signal from the interrogator and transmit, based on the at least one interrogation signal, the at least one response signal to the interrogator is configured to receive, using the first antenna, the at least one interrogation signal, receive, using the second antenna, the at least one interrogation signal, where there is a path length difference between the at least one interrogation signal received using the first antenna and the at least one interrogation signal received using the second antenna, calculate the path length difference between the at least one interrogation signal received using the first antenna and the at least one interrogation signal received using the second antenna, determine whether the calculated path length difference exceeds a threshold path length difference, and transmit, based the calculated path length difference, the at least one response signal.

According to aspects of the disclosure, there is provided a method of passive wireless sensing. The method comprises using passive circuitry of a passive wireless sensor receiving, using a first antenna, at least one interrogation signal from an interrogator, receiving, using a second antenna, the at least one interrogation signal from the interrogator, where there is a path length difference between the at least one interrogation signal received using the first antenna and the at least one interrogation signal received using the second antenna, and transmitting, based on the path length difference, at least one response signal to the interrogator.

In some embodiments, transmitting, based on the path length difference, the at least one response signal to the interrogator comprises transmitting the at least one response signal comprising position information associated with the passive wireless sensor.

In some embodiments, the method further comprises, using the passive circuitry calculating the path length difference between the at least one interrogation signal received using the first antenna and the at least one interrogation signal received using the second antenna and determining whether the calculated path length difference exceeds a threshold path length difference.

In some embodiments, transmitting, based the path length difference, the at least one response signal comprise in response to determining that the calculated path length difference does not exceed the threshold path length difference, transmit the at least one response signal comprising the position information, where the position information indicates that the passive wireless sensor has not moved more than a threshold amount and in response to determining that the calculated path length difference does exceed the threshold path length difference, transmit the at least one response signal comprising the position information, where the position information indicates that the passive wireless sensor has moved more than a threshold amount.

In some embodiments, the method further comprises, using the interrogator, in response to receiving the at least one response signal comprising the position information, where the position information indicates that the passive wireless sensor has moved more than a threshold amount, triggering an alert indicating that at least one of a counterfeit attack, a tampering attack, or a replay attack has occurred.

In some embodiments, the threshold amount comprises a threshold angle.

BRIEF DESCRIPTION OF THE DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear.

FIG. 2A is a plot illustrating the admittance of a passive wireless sensor as a function of frequency, in accordance with some embodiments.

FIG. 2B is a plot illustrating an interrogation signal of an interrogator and a response signal of a passive wireless sensor, in accordance with some embodiments.

DETAILED DESCRIPTION

Figure 1A:
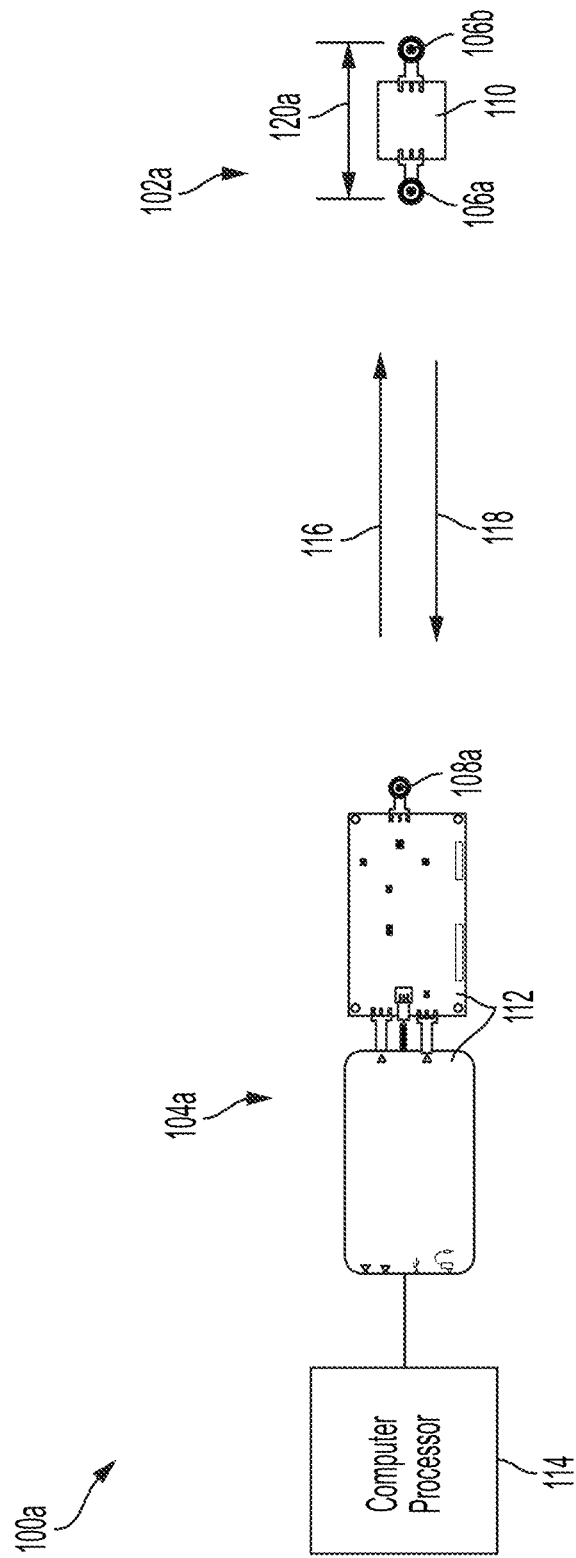
FIG. 1A is a diagram illustrating a passive wireless sensor and an interrogator, in accordance with some embodiments.

The inventors have recognized that a secure passive wireless sensing system may provide security to wireless sensing environments. In some embodiments, a secure passive wireless sensing system may include a passive wireless sensor that is wirelessly coupled with an interrogator. The passive wireless sensor may be interrogated by the interrogator to obtain a characteristic measured by the sensor. The system may provide security by providing position information of the sensor or by scrambling a response signal sent by the sensor. For example, the sensor and/or the interrogator may include multiple antennas and the system may determine the position of a sensor based on path length differences of signals received or sent by the multiple antennas.

The sensor may include one or more antennas configured to receive an interrogation signal from the interrogator. The sensor may include multiple antennas and passive circuitry configured to determine a path length difference between the interrogation signal as received by each of the multiple antennas. The path length difference may change based on the physical position of the antennas of the sensor relative to a direction of the interrogation signal. Thus, the path length difference may represent a position of the sensor relative to the interrogator. Based on the determined path length difference, the sensor may transmit a response signal to the interrogator.

In some embodiments, the interrogator may include multiple antennas. In some embodiments, the position of the sensor may be determined using the multiple antennas of the interrogator instead of using or in addition to using to the multiple antennas of the sensor. In some embodiments, the interrogator may use a beamforming approach to determine an angle-of-arrival that enhances a signal received from a sensor and determined the position of the sensor using that angle-of-arrival.

The interrogator may analyze the response signal to determine a position of the sensor. The interrogator may store a previous known position of the sensor, such as a known installed position of the sensor. The interrogator compares the determined sensor position to the known installed sensor position. Using the comparison, the interrogator may determine whether a spoofing attack has occurred, such as a replay attack, a counterfeit attack, or a tampering attack. In some embodiments, the position information may be used to identify one sensor out of a set of two or more sensors.

In some embodiments, the passive circuitry of the sensor may include cryptographic circuitry. The cryptographic circuitry may be configured to scramble the response signal. The scrambled response signal may not be read without a decoder. Accordingly, if an attack such as a sniffing attack occurs, the response signal may not be read without the decoder.

Some aspects of the present application relate to passive wireless sensors. Some aspects are related to radio frequency security and identification for such sensors.

Passive wireless sensors may be used in a variety of applications. For example, passive wireless sensors may be deployed in automotive or industrial applications, as non-limiting examples. The passive wireless sensors may be configured to detect temperature, pressure, or other characteristics of interest. For example, a plurality of passive wireless temperature sensors may be deployed at various locations of a car, in hard-to-reach locations.

In some embodiments, a passive sensor may include no active components. For example, a passive sensor may not include any energy storage or energy harvesting components. In some embodiments, a passive wireless sensor may receive an interrogation signal from an interrogator and reflect a reflected signal to the interrogator. In some embodiments, a passive sensor may comprise an electronics-free sensor. In some embodiments, an electronics-free device may comprise no active electronics or power source.

In some embodiments, a passive wireless sensor may comprise a temperature sensor such as a surface acoustic wave (SAW) sensor, which may be a microelectromechanical systems (MEMS) device. In some embodiments, a reflected signal of a passive wireless sensor may be dependent on a temperature of the sensor. A temperature sensor may be used to monitor the temperature of objects that may be sensitive to heat. The objects may be remote objects that are difficult to access, for example, components of an automobile. Alternatively or additionally, a remote object may not have existing wiring configured to supply power, for example, a rotating wheel end.

Secure aspects of a device may be categorized under different objectives. In some embodiments, objectives of a secure device may include confidentiality, integrity, and availability. Different aspects of the technology described herein may relate to one or more objectives such as confidentiality, integrity, or availability.

Some aspects of the present application are related to identifying a part as a genuine part, for example, a part made by or provided by a particular entity. For example, an entity may be a particular company, designer, manufacturer, and/or user. In some embodiments, to identify genuine parts, spurious responses (for example, frequency, phase, or amplitude) and methods of interrogation of obtain these responses may be used. In some embodiments, to identify genuine parts, physical characteristics of the sensors specific to sensors manufactured or designed by a particular entity and method of interrogation these characteristics may be used.

Some aspects of the present application relate to identifying a specific part independently within a group of parts. For example, in the context of multiple wireless temperature sensors disposed at various locations on a car and communicating with a common reader, aspects of the technology provide for differentiation between the sensors. In some embodiments, to identify a specific part in a group, a specific range of interrogation frequencies may be used. In some embodiments, to identify a specific part in a group, spurious responses (for example, frequency, phase, or amplitude) and methods of interrogation to obtain these responses may be used. In some embodiments, to identify a specific part in a group, a beamforming approach on either the sensor-side or interrogator-side or both and corresponding methods of interrogation may be used. In some embodiments, to identify a specific part in a group, scrambled and/or modulated interrogation and methods to decode said scrambling or modulation may be used.

In some embodiments, a beamforming approach may be used to provide integrity for a secure device. In some embodiments, a beamforming approach may be used to identify a specific part individually within a group of parts. In some embodiments, a beamforming approach may be implemented from a sensor side. For example, a sensor may comprise two or more antennas, for example, dual antennas. In some embodiments, in response to an interrogation signal, a dual-antenna sensor may reflect a two-pole response reflection signal. A two-pole response may comprise an even mode response having a peak at a first frequency and an odd mode response having a peak at a second frequency different than the second frequency. In some embodiments, a two-pole response may be a function of an interrogation angle.

For example, the two antennas may be arranged in a line having a normal. In some embodiments, the antennas are spaced a distance of about 5λ/8, where λ is the wavelength of an interrogation signal. When the angle between the normal and an interrogation signal is less than about 60 degrees, the interrogator may detect only the even mode response of the reflected signal. When the angle between the normal and an interrogation signal is about 60 degrees, the interrogator may detect each of the even mode response and the odd mode response of the reflected signal. When the angle between the normal and an interrogation signal is greater than about 60 degrees, the interrogator may detect only the odd mode response of the reflected signal. Other arrangements are possible. By detecting the presence of each of the even mode response or the odd mode response, the angle of the sensor with respect to the interrogator may be determined. In this manner, the response may act like a watermark, changing based on the angle of interrogation. Thus, embodiments of the present application provide a radio frequency (RF) watermark, and in some embodiments the RF watermark may be used to detect positioning and/or orientation of a passive wireless sensor.

Alternatively or additionally, a beamforming approach may be implemented from an interrogator side. In some embodiments, an interrogator may have a previous known location of one or more sensors. The interrogator may identify a specific sensor of the one or more sensors using beamforming. In some embodiments, an interrogator may comprise two or more antennas. Each antenna may be coupled to a same transceiver, for example, a radio transceiver. In some embodiments, when the interrogator interrogates one or more sensors, the interrogator may adjust the phase of each transceiver chain to steer power towards a target sensor. When the interrogator interrogates one or more sensors, the interrogator may subsequently receive a respective return signal from one or more sensors and apply digital beamforming on the respective received signals from the two or more antennas. In some embodiments, after interrogation, the interrogator may use beamforming to determine which angle-of-arrival enhances a combined signal from a sensor. The interrogator may then determine that the angle-of-arrival that enhances the signal is an angle that corresponds to a position of a sensor.

Various types of spoofing attacks exist. For example, in one spoofing attack, a sensor may be replaced with a counterfeit sensor or may be tampered with. A counterfeit sensor may be used to send counterfeit data to an interrogator, or a tampered-with sensor may send incorrect data. In another spoofing attack, a counterfeit interrogator attempts to receive a reflected signal from a sensor and relay that signal to a trusted interrogator to attempt to avoid detection. In another spoofing attack, an interrogator may be replaced with a counterfeit interrogator or may be tampered with. A counterfeit interrogator may be used to send counterfeit data to a processing unit, or a tampered-with interrogator may send incorrect data.

A beamforming approach may be used to counter a spoofing attack. In a spoofing attack where a counterfeit interrogator attempts to receive a reflected signal from a sensor and relay that signal to a trusted interrogator, if the counterfeit interrogator is positioned at a different position and/or angle than the trusted interrogator, it will receive a different reflected signal, and the trusted interrogator may determine that there is a spoofing attack in progress. A beamforming approach may be used to detect device replacement or tampering. Based on the detected relative angle between an interrogator and sensor pair and a previous known relative angle of the same interrogator and sensor pair, it may be determined if an interrogator or a sensor was moved, for example, because it was replaced or tampered with. In some embodiments, the previous known relative angle may be determined at installation.

In some embodiments, a scrambling or obfuscation technique may be used to provide a degree of confidentiality for a secure device, such as for a secure electronics-free passive sensor device. In some embodiments, a scrambling technique may prevent eavesdroppers from being able to learn what a plaintext signal represents since only a trusted interrogator that is provisioned with a right decoding method will be able to interpret signals correctly.

For example, a scrambling technique may be used to identify a specific sensor of a group of sensors. In some embodiments a sensor may be identified by its response using passive circuitries on the sensor side. In some embodiments, techniques similar to a digital stream cipher, such as a linear-feedback shift register (LFSR)-based one-time pad, may be used. In some embodiments, a passive cipher block may comprise passive components that represent the key storage, passive components that perform arithmetic operations, passive components that perform Boolean operations, and/or passive components that perform delay operations.

Passive components that represent the key storage may comprise a designed pattern with passive elements. Passive components that represent the key storage may have different waveguide termination schemes, for example, RF or acoustic. Passive components that perform arithmetic operations may perform operations such as sum and negation and may perform operations in amplitude or phase domain. Such a passive component that performs arithmetic operations may comprise a hybrid coupler both in RF and acoustic domain. Passive components that perform Boolean operations may perform operations such as AND or OR, and may perform operations in amplitude or phase domain, such as mixing with an acoustic correlator. Passive components that perform delay operations may comprise a waveguide, for example, RF transmission line matrix (TLM) or acoustic.

In some embodiments, when using a scrambling technique, when an interrogator interrogates a sensor, the interrogator generates a modulated signal, (for example, binary phase shift keying (BPSK)) and transmits the modulated signal to the sensor. A sensor, such as a passive sensor, may receive the modulated signal and reflect the signal back to the interrogator. In some embodiments, reflecting the signal back to the interrogator comprises passing the signal through a passive cipher circuit and encoding the received modulated signal. In some embodiments, encoding the signal comprises mixing the signal with a pseudo-random sequence generated by a key value stored on the passive sensor, for example, using multiplication. In some embodiments, encoding the signal comprises adding the signal with a pseudo-random sequence generated by a key value stored on the passive sensor.

A scrambling approach may be used to identify a replaced or tampered-with sensor. An interrogator may receive sensor responses and decode the received signals. In embodiments with two or more sensors, the interrogator may separate responses from different sensors. The interrogator may validate a decoded signal associated with a sensor by comparing the signal with a previous known key of that sensor. An interrogator may detect that a sensor has been replaced with a counterfeit sensor if the received reflected signal does not match an expected signal that is based on the previous known key of that sensor.

FIG. 1A depicts one embodiment of a passive wireless sensing system 100a including a sensor 102a and an interrogator 104a. The interrogator 104a may comprise a transceiver and the interrogator 104a is in communication with the sensor 102a wirelessly.

The interrogator includes at least one antenna 108a and transmit and/or receive circuitry 112 and is coupled to at least one computer processor 114. In some embodiments, antenna 108a serves as both a transmit antenna and a receive antenna of interrogator 104a. In other embodiments, antenna 108a serves as the transmit antenna, and another, separate antenna serves as the receive antenna. The at least one computer processor 114 may include at least one non-transitory computer-readable storage medium. The at least one non-transitory computer-readable storage medium may store a plurality of computer-readable instructions that, when executed by the at least one computer processor 114, cause the at least one computer processor 114 to execute a method, such as one of the methods described in the disclosure.

Sensor 102a may be a passive wireless sensor. The sensor 102a includes at least two antennas 106a and 106b and passive circuitry 110. Antennas 106a and 106b may serve as both transmit antennas and receive antennas, or alternatively, antennas 106a and 106b may be transmit antennas, and there may be one or more separate receive antenna. Antenna 106a is disposed at a distance 120a from antenna 106b. In some embodiments, distance 120a may be approximately $5\lambda/8$ where $\lambda$ is a wavelength of an interrogation signal.

Antenna 108a is in wireless communication with antennas 106a and 106b. For example, the interrogator 104a may send an interrogation signal 116 to the sensor 102a. In response to the interrogation signal 116, the sensor 102a may send a response signal 118 to the interrogator 104a.

Figure 1B:
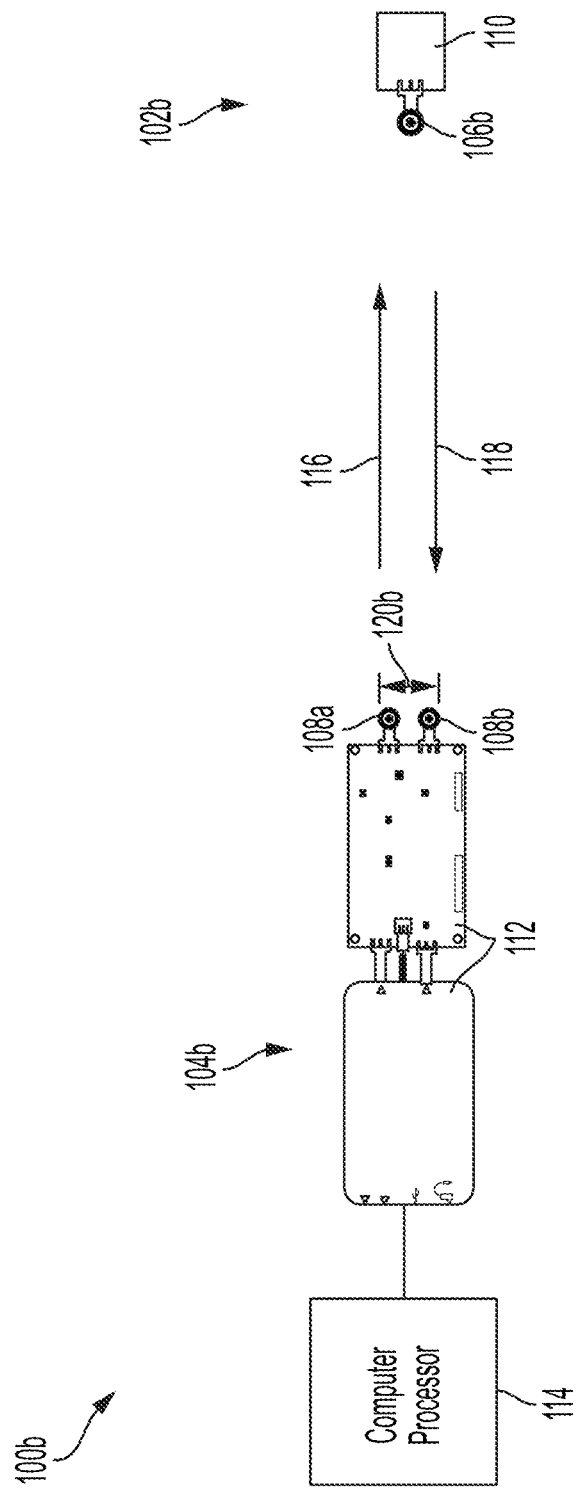
FIG. 1B is a diagram illustrating a passive wireless sensor and an interrogator, in accordance with some embodiments.

FIG. 1B depicts an alternative embodiment of a passive wireless sensing system 100b including a sensor 102b and an interrogator 104b. Interrogator 104b differs from interrogator 104a in that interrogator 104b includes antennas 108a and 108b compared with interrogator 104a including antenna 108a. In interrogator 104b, antenna 108a is disposed at a distance 120b from antenna 108b. In some embodiments, distance 120b may be approximately $5\lambda/8$ where $\lambda$ is a wavelength of an interrogation signal. Sensor 102b differs from sensor 102a in that sensor 102b includes antenna 106a compared with sensor 102a including antennas 106a and 106b. Antennas 108a and 108b are in wireless communication with antenna 106a.

Various portions of the disclosure and the figures may refer to sensor 102a and interrogator 104a. Unless otherwise indicated, at these portions of the disclosure and in these figures, sensor 102b and interrogator 104b may together be substituted for sensor 102a and interrogator 104a.

The sensor 102a may be placed at a remote location for sensing a characteristic, including an environmental characteristic, such as temperature, pressure, acoustic intensity, ultrasound intensity, light intensity, infrared intensity, carbon dioxide concentration, nitrogen oxide concentration, pH, liquid or air flow, air speed and/or depth, among other environmental characteristic, and/or a physical characteristic, such as the acceleration, speed, position and/or rate or rotation of a body, a heart rate or other medical conditions associated with a patient, among other physical conditions.

In some embodiments, the sensor 102a may be passive (e.g., without batteries or other power supplies), and may not include energy harvesters including kinetic energy harvesters (e.g., from mechanical vibrations), thermal energy harvesters (e.g., from a temperature gradient), photovoltaic energy harvesters, and/or radio frequency energy harvesters.

In some embodiments, sensor 102a may receive electromagnetic radiation collected with first and second antennas 106a and 106b. For example, sensor 102a may receive energy from a same signal that interrogates the sensor 102a.

Sensing of a characteristic may be performed by sensing the resonant frequency of a sensor. FIG. 2A is a plot illustrating the input admittance of a sensor such as sensor 102a, as seen from an interrogator such as interrogator 104a, as a function of frequency. Responses 202 and 204 represent the input admittance of the sensor at a first value and a second, respectively, of a certain environmental or physical characteristic. For example, response 202 may represent the admittance at temperature T1 and response 204 may represent the admittance at temperature T2, with T1 being different than T2. Frequency fr1 indicates the resonant frequency of response 202 and frequency fr2 indicates the resonant frequency of response 204. In some embodiments, the environmental or physical characteristic of interest may be quantified by identifying the resonant frequency of the sensor. Thus, in some embodiments, the interrogator may interrogate the sensor determine the resonant frequency of the sensor.

In some embodiments, the environmental or physical characteristic of interest may be quantified by determining the amplitude or envelope of the response of the sensor. Determining the characteristic to be measured may involve interrogating the sensor in a wireless fashion. This may be achieved by transmitting one or more interrogation signals to the sensor using an antenna of the interrogator. Each interrogation signal may be, for example, a sinusoidal signal, though other types of signals may be used. In response to receiving the interrogation signal(s), the sensor may transmit a response signal. The response signal may be a signal oscillating at the resonant frequency of the sensor. As noted above, the resonant frequency may depend on the characteristic to be measured. For example, a higher temperature may lead to a higher resonant frequency, or vice versa, depending on the arrangement of the sensor's circuit. FIG. 2B is a plot illustrating the field (e.g., the electric field) of a representative interrogation signal as transmitted by the antenna of an interrogator, and the field of a representative response signal as transmitted by an antenna of a sensor. Both signals are plotted as a function of time. In this example, interrogation signal includes a pulse 206 oscillating at a certain frequency, referred to herein as the interrogation frequency. The response signal includes an echo 208 oscillating at the resonant frequency of the sensor, where the denomination "echo" indicates a pulse generated in response to reception of an interrogating pulse. Echo 208 has a decaying envelope due to the limited energy available at the sensor. The decay rate of the envelope may depend upon various factors, including for example upon the electric characteristics of the sensor. Upon receiving the pulse, the interrogator determines the frequency of oscillation of the echo and determines the characteristic to be measured based on that frequency.

Figure 3A:
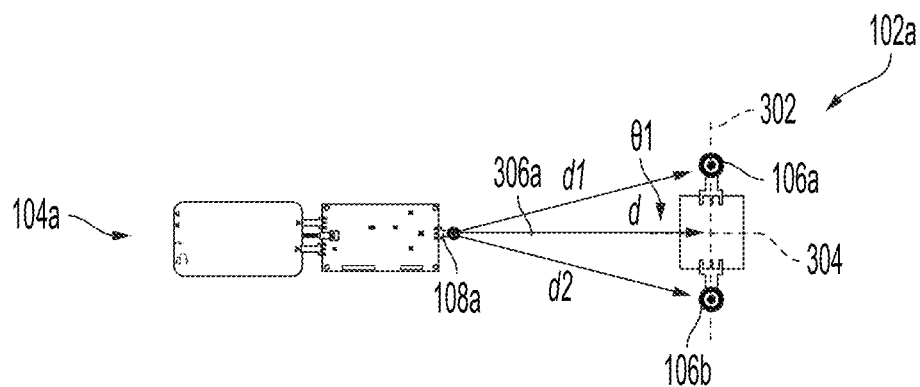
FIG. 3A is a diagram illustrating a passive wireless sensor and an interrogator during interrogation, in accordance with some embodiments.
Figure 3B:
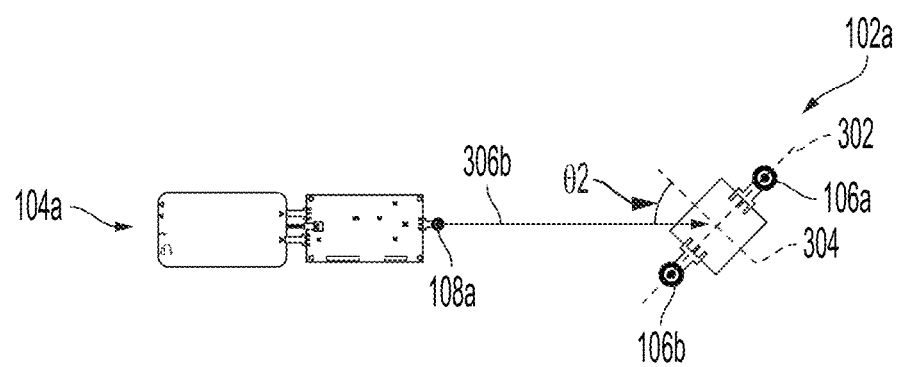
FIG. 3B is a diagram illustrating a passive wireless sensor and an interrogator during interrogation, in accordance with some embodiments.
Figure 3C:
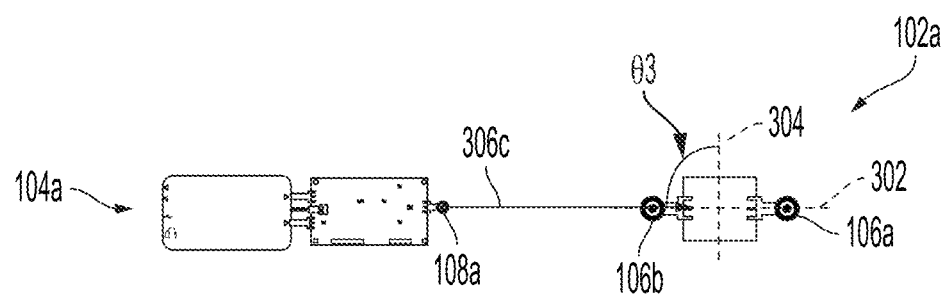
FIG. 3C is a diagram illustrating a passive wireless sensor and an interrogator during interrogation, in accordance with some embodiments.

FIGS. 3A-3C illustrate interrogator 104a interrogating sensor 102a at three different positions of the sensor 102a. As shown in FIGS. 3A-3C, the antennas 106a and 106b of sensor 102a are arranged along an antenna axis 302. Normal axis 304 is normal to the antenna axis 302 and bisects the antenna axis 302 equidistant from antennas 106a and 106b.

In the embodiments of FIGS. 3A-3C, the bisection of the antenna axis 302 and normal axis 304 is disposed distance d from antenna 108a. Antenna 106a is disposed a distance d1 from antenna 108a. Antenna 106b is disposed a distance d2 from antenna 108a. A differential distance $\Delta d$ is equal to the difference between distances d1 and d2. Distances d, d1, and d2 are omitted from FIGS. 3B and 3C for clarity of illustration.

In FIG. 3A, antenna 108a transmits interrogation signal 306a to sensor 102a. Angle θ1 represents an angle between the interrogation signal 306a and the normal axis 304. In FIG. 3A, angle θ1 is zero degrees. In FIG. 3A, the differential distance Δd is zero. Accordingly, when each of antennas 106a and 106b receives the interrogation signal 306a, there will be zero path length difference between the two received signals.

In FIG. 3B, antenna 108a transmits interrogation signal 306b to sensor 102a. Angle θ2 represents an angle between the interrogation signal 306b and the normal axis 304. In FIG. 3B, angle θ2 is a threshold angle. The threshold angle may be greater than zero degrees and less than ninety degrees and may for example be sixty degrees. In FIG. 3B, the differential distance Δd may be a threshold distance. The threshold distance may be greater than zero and less than the distance 120a between antennas 106a and 106b. Accordingly, when each of antennas 106a and 106b receives the interrogation signal 306b, there will be threshold path length difference between the two received signals. The threshold path length difference may be greater than zero and less than the distance 120a between antennas 106a and 106b. The threshold path length difference at an angle θ2 of sixty degrees and with antenna distance 120a may be approximately $\lambda/4$ where $\lambda$ is a wavelength of the interrogation signal. The threshold angle may be adjusted by adjusting the distance 120a between the antennas 106a and 106b.

In FIG. 3C, antenna 108a transmits interrogation signal 306c to sensor 102a. Angle θ3 represents an angle between the interrogation signal 306c and the normal axis 304. In FIG. 3C, angle θ3 is ninety degrees. In FIG. 3C, the differential distance Δd is greater than zero and is the distance 120a between antennas 106a and 106b. Accordingly, when each of antennas 106a and 106b receives the interrogation signal 306c, there will be a maximum path length difference between the two received signals that is the distance 120a between of antennas 106a and 106b. For example, where the distance 120a is approximately $5\lambda/8$ where $\lambda$ is a wavelength of an interrogation signal, the path length difference may be approximately $5\lambda/8$.

In some embodiments, a path length difference at the interrogator side may be used to determine position information of a sensor. For example, in some alternative embodiments, instead of interrogator 104a having antenna 108a, there may be interrogator 104b having antennas 108a and 108b and instead of sensor 102a having antennas 106a and 106b, there may be sensor 102b having antenna 106a. In such embodiments, similar effects on path length difference may be achieved. For example, each of antennas 108a and 108b may transmit an interrogation signal to or receive a response signal from antenna 106a. Just as described in relation to FIGS. 3A-3C, depending on the orientation of the interrogator 104b relative to the sensor 102b, the antenna 106a may send the two interrogation signals with a path length difference between the two interrogation signals or receive two response signals with path length difference between the two response signals. In further still embodiments, each of an interrogator and a sensor may include two or more antennas. In such embodiments, path length differences may be determined based on both positions of the two or more antennas of the interrogator and the positions of the two or more antennas of the sensor.

Figure 8:
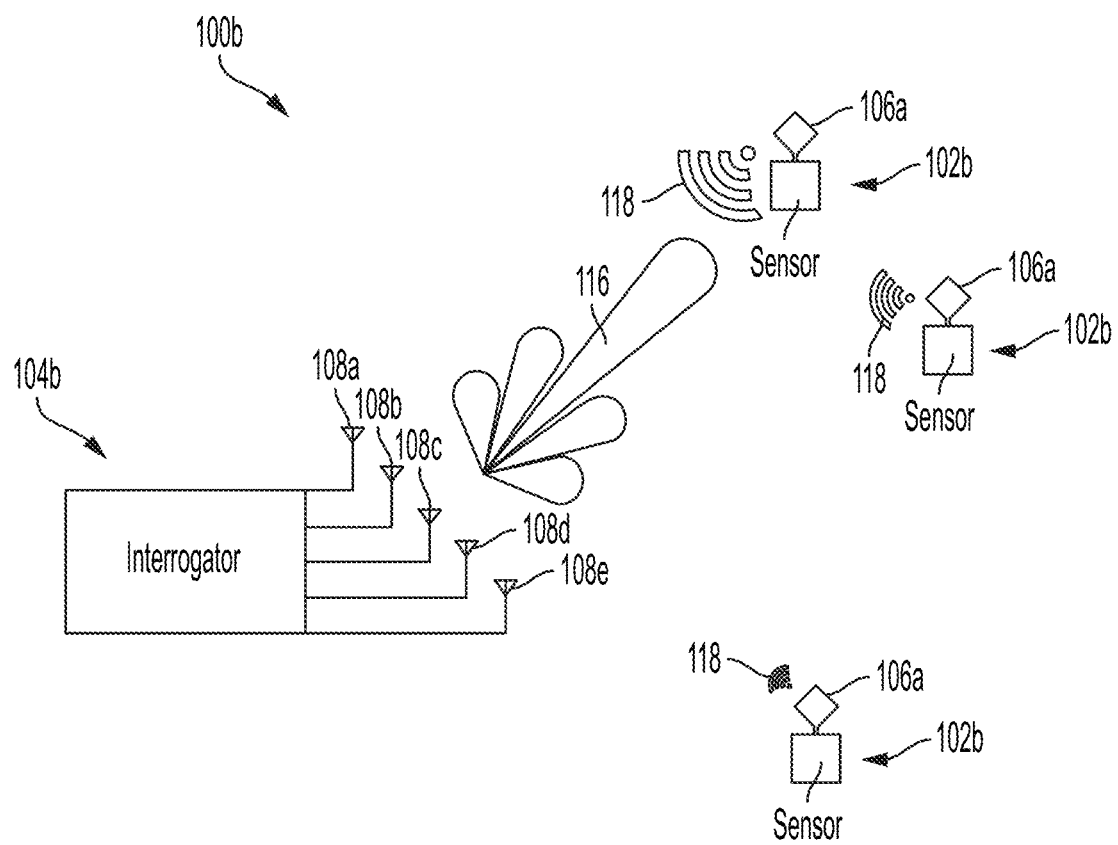
FIG. 8 is a diagram illustrating an operating environment of a passive wireless sensor and an interrogator, in accordance with some embodiments.

In some embodiments, a beamforming approach may be performed at an interrogators side to determine position information of a sensor. FIG. 8 illustrates a beam forming approach using system 102b. In FIG. 8, interrogator 104b is illustrated as including five antennas 108a, 108b, 108c, 108d, and 108e. In FIG. 8, system 102b is illustrated as including three sensors 102b. Interrogator 104b may store a known position of one or more of the sensors 102b and then identity individual sensors using beamforming. The interrogator 104b comprises multiple antennas and each antenna connects to transmit and/or receive circuitry. As shown in FIG. 8, during interrogation, the interrogator adjusts the phase of signals provided to each antenna to steer power towards a target sensor via interrogation signal 116. During interrogation, the interrogator 104b subsequently receives a response signal 118 from each sensor 102b. The interrogator 104b then apply digital beamforming on the received signals from the multiple antennas. After interrogation, the interrogator can determine which angle-of-arrival enhances the combined signal via beamforming. Once the angle-of-arrival is determined, the interrogator may compare that angle to the stored position of the sensors and identify the sensors. In addition, for a particular sensor, if the angle-of-arrival is different than the stored position of the sensor, the interrogator 104b may determine that a spoofing attack, such as a replay attack, a counterfeit attack, or a tampering attack has occurred.

Passive circuitry 110 included in the sensor 102a may be configured to provide an output based on path length difference for a received interrogation signal. Passive circuitry 110 may receive the interrogation signal at each of the antennas 106a and 106b. The passive circuitry 110 may then calculate a path length difference between the interrogation signal received using each of the antennas 106a and 106b. The passive circuitry 110 may then determine whether the path length difference exceeds a threshold path length difference.

In some embodiments, the passive circuitry 110 may comprise a two-pole filter, such as a two-pole SAW filter. A two-pole filter may comprise two resonators coupled together, which may provide a passband. The SAW filter has two resonant modes that each separately respond to common mode or differential interrogation signals. Each of the two resonators may be coupled to one of the antennas 106a and 106b and may receive the interrogation signal from the coupled antenna. By connecting the two antennas spaced by at distance 120a, for example, $5/8\lambda$, to the SAW filter, an interrogation may provide a common mode or differential excitation depending on the path length difference to each antenna. The path length difference may alter which resonant mode is dominant and may alter the frequency response of the filter. When the antennas 106a and 106b provide the resonators with the interrogation signal with different path length differences, the passive circuitry 110 may provide different outputs. For example, when an even mode is applied, a first ringdown corresponding to a first frequency may be output by the passive circuitry 110. When an odd mode is applied, a first ringdown corresponding to a second frequency may be output by the passive circuitry 110.

In some embodiments, delays or mismatches between the modes may be provided in the SAW filter itself or on board-level or chip-scale passive components used for matching. The response of the sensor at different orientations may be varied using a delay or mismatch based on spatial constraints of an operating environment. In some embodiments, a sensor may comprise more than two resonators, which may provide additional modes to the two modes described above. Accordingly, three or more modes may be provided, each corresponding to different threshold angles, and each providing different response frequencies.

Figure 4A:
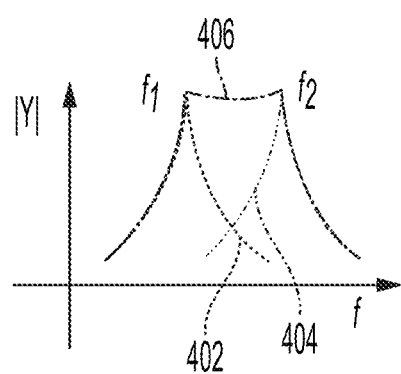
FIG. 4A is a plot illustrating frequency response of a passive wireless sensor, in accordance with some embodiments.

As shown in FIG. 4A, a sensor such as sensor 102a may provide a two-port response 406. In FIG. 4A, the horizontal axis represents frequency, and the vertical axis represents amplitude. The two-port response comprises an even mode response 402 at a first frequency and an odd mode response 404 at a second frequency. The even mode response 402 may correspond to a first ringdown at frequency f1 of sensor 102a. The odd mode response 404 may correspond to a second ringdown at frequency f2 of sensor 102a. Depending on the path length difference of the interrogation signal as received by antennas 106a and 106b, the even mode response 402 may have a larger amplitude than the odd mode response 404 or vice versa. In some embodiments, when the path length difference is less than a threshold path length difference, the even mode response 402 may have a larger amplitude than the odd mode response 404. In some embodiments, when the path length difference is greater than a threshold path length difference, the odd mode response 404 may have a larger amplitude than the even mode response 402.

Figure 4B:
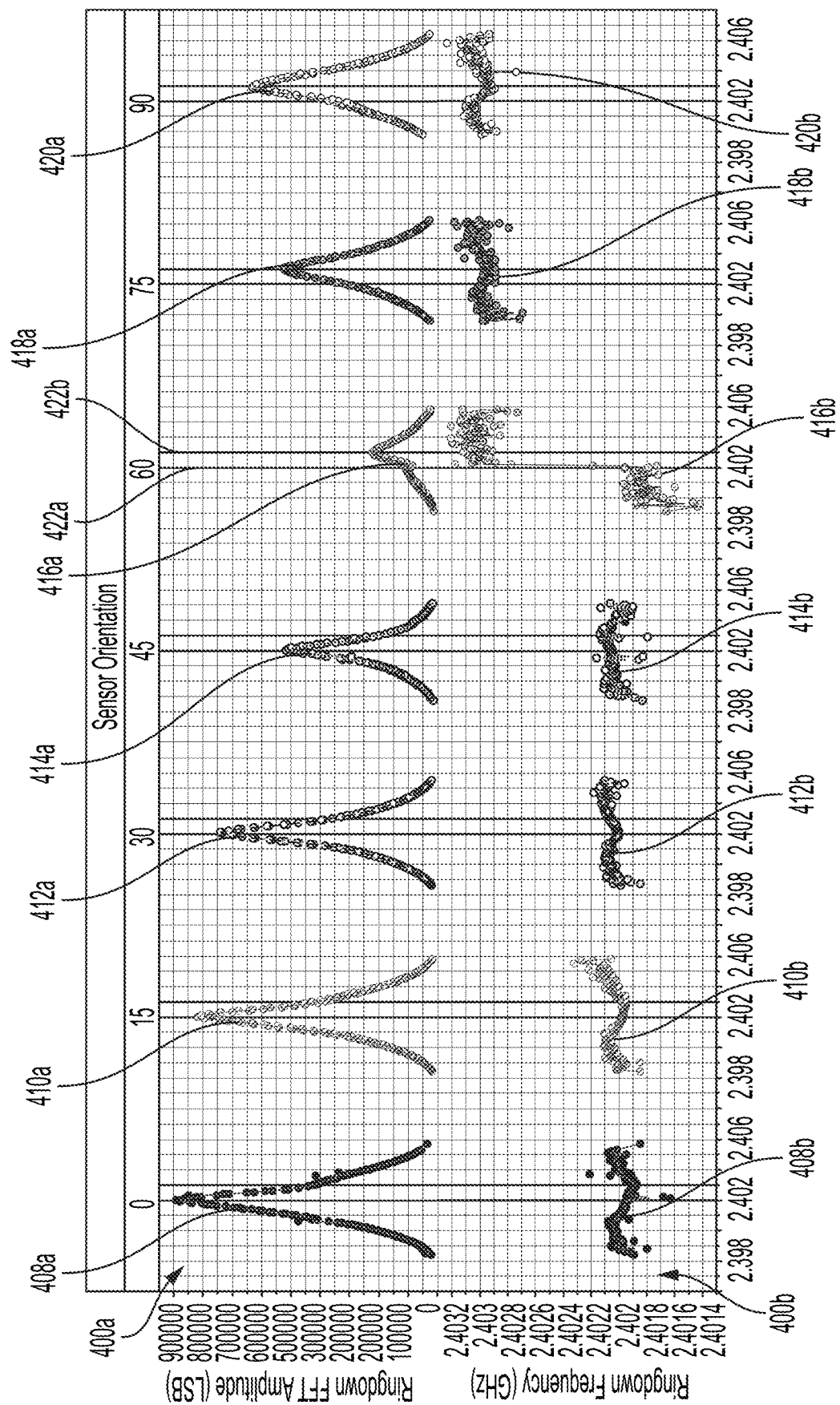
FIG. 4B is a plot illustrating frequency response of a passive wireless sensor in relation to sensor position, in accordance with some embodiments.

FIG. 4B shows further examples of a two-port response that may be provided by a sensor such as sensor 102a. Plot 400a has a horizontal axis representing ringdown frequency and a vertical axis representing ringdown amplitude. Plot 400b has a horizontal axis representing interrogation frequency and vertical axis representing ringdown frequency. Frequency 422a represents a first response mode frequency, for example, an even mode response frequency. Frequency 422b represents a second response mode frequency, for example, an odd mode response frequency.

Curves 408a and 408b correspond to an embodiment where there is an angle between an interrogation signal and a normal axis of a sensor of zero degrees, such as illustrated in FIG. 3A. Curves 410a and 410b correspond to an embodiment where there is an angle between an interrogation signal and a normal axis of a sensor of fifteen degrees. Curves 412a and 412b correspond to an embodiment where there is an angle between an interrogation signal and a normal axis of a sensor of thirty degrees. Curves 414a and 414b correspond to an embodiment where there is an angle between an interrogation signal and a normal axis of a sensor of forty-five degrees. Curves 416a and 416b correspond to an embodiment where there is an angle between an interrogation signal and a normal axis of a sensor of sixty degrees, such as illustrated in FIG. 3B. Curves 418a and 418b correspond to an embodiment where there is an angle between an interrogation signal and a normal axis of a sensor of seventy-five degrees. Curves 420a and 420b correspond to an embodiment where there is an angle between an interrogation signal and a normal axis of a sensor of ninety degrees, such as illustrated in FIG. 3C.

FIG. 4B illustrates the two-port response where the path length difference is less than, equal to, or greater than the threshold path length difference. For curves 408a, 408b, 410a, 410b, 412a, 412b, 414a, and 414b, where the angle between the interrogation signal and the normal axis of the sensor is less than the threshold angle of sixty degrees, the even mode response at frequency 422a has a greater amplitude than the odd mode response at frequency 422b. For curves 416a and 416b, where the angle between the interrogation signal and the normal axis of the sensor is the threshold angle, the even mode response at frequency 422a may have an approximately equal amplitude as the odd mode response at frequency 422b. For curves 418a, 418b, 420a, and 420b where the angle between the interrogation signal and the normal axis of the sensor is greater than the threshold angle of sixty degrees, the odd mode response at frequency 422b has a greater amplitude than the even mode response at frequency 422a.

The sensor 102a may provide different response signals to the interrogator 104a depending on the response mode of the passive circuitry. For example, antenna 106a and/or antenna 106b may provide a response signal having a first frequency when the passive circuitry 110 provides an even mode response and may provide a response signal having a second frequency when the passive circuitry 110 provides an odd mode response. The frequency of the response may represent position information of the sensor 102a. Based on the frequency of the response signal received by the antenna 108a, the interrogator 104a may determine whether the angle between the interrogation signal and the normal of the sensor exceeds the threshold angle. Based on the position information, interrogator 104a may determine whether a spoofing attack has occurred, such as a replay attack, a counterfeit attack, or a tampering attack.

In some embodiments, the position information may be used to identify one sensor out of a set of two or more sensors. For example, the interrogator may know that a first sensor is disposed at a first position. When the interrogator receives response signals from two sensors, a first response signal corresponding to a first position and a second response signal corresponding to a second position, the interrogator may determine that the first response signal came from the first sensor. In some embodiments, the interrogator may use the position information in combination with signal strength to identify one sensor from a set of two or more sensors.

In some embodiments, the passive circuitry 110 may alternatively or additionally include cryptographic circuitry configured to scramble an interrogation signal and provide a response signal based on the scrambled signal. For example, when the passive circuitry receives an interrogation signal from an interrogator using antennas 106a and 106b, the passive circuitry 110 may apply a cryptographic algorithm to the interrogation signal to generate a scrambled signal. The passive circuitry may then cause the antenna 106a and/or antenna 106 to transmit a response signal to the interrogator based on the scrambled signal. The response signal based on the scrambled signal may not be able to be read without a decoder. A sniffing attack may occur, where a malicious interrogator intercepts the response signal and attempts to obtain information from the response signal. Where the response signal is based on the scrambled signal, the malicious interrogator may not read the response signal without the decoder, and the sniffing attack may be thwarted. Passive circuitry 110 may use the cryptographic circuitry in combination with the two-port response circuitry.

Figure 9:
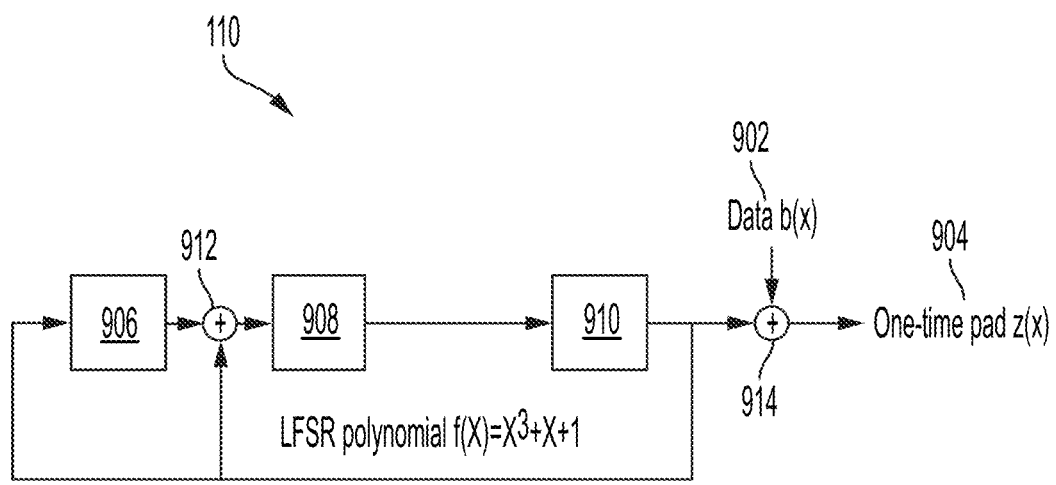
FIG. 9 is a diagram illustrating passive circuitry of a passive wireless sensor, in accordance with some embodiments.

For example, the passive circuitry 110 may include cryptographic circuitry illustrated in FIG. 9. Passive components that represent the key storage may comprise a designed pattern with passive elements. Passive components that represent the key storage may have different waveguide termination schemes, for example, RF or acoustic. Passive components that perform arithmetic operations may perform operations such as sum and negation and may perform operations in amplitude or phase domain. Such a passive component that performs arithmetic operations may comprise a hybrid coupler both in RF and acoustic domain. Passive components that perform Boolean operations may perform operations such as AND or OR, and may perform operations in amplitude or phase domain, such as mixing with an acoustic correlator. Passive components that perform delay operations may comprise a waveguide, for example, RF TLM or acoustic.

In some embodiments, when using a scrambling technique, when an interrogator interrogates a sensor, the interrogator generates a modulated signal, for example, BPSK, and transmits the modulated input signal 902 to the sensor. A sensor, such as a passive sensor, may receive the modulated input signal 902 and provide a response signal 904 to the interrogator. In some embodiments, reflecting the signal back to the interrogator comprises passing the signal through a passive cipher circuit and encoding the received modulated signal. In some embodiments, encoding the signal comprises mixing the signal with a pseudo-random sequence generated by a key value stored at stages 906, 908, and 910 on the passive sensor, for example, using multiplication, or using adders 912 and 914. In some embodiments, encoding the signal comprises adding the signal with a pseudo-random sequence generated by a key value stored on the passive sensor.

Such a scrambling approach may be used to identify a spoofing attach such as a counterfeit attack or a tampering attack and may be used to thwart a sniffing attack. If a sensor is replaced or tampered with, the interrogator may attempt to validate a decoded signal associated with a sensor by comparing the signal with a previous known key of that sensor. If the interrogator receives a response signal that does not match an expected signal based on the previous known key of that sensor, the interrogator may determine that the sensor has been replaced with a counterfeit sensor or tampered with. If a malicious interrogator attempts to intercept and read an encoded response signal, it may not do so without the decoder and the sniffing attack may be thwarted.

Passive circuitry 110 may include circuitry configured to provide identification of a sensor as a genuine part and/or may include circuitry configured to assist with identification of a specific part within a group of parts. For example, a sensor may have designed spur frequencies or spurious amplitude and/or phase response to be used during interrogation. A spur in frequency response of a sensor may be artificially introduced using a via a Laser kerf using Laser Trimming Techniques. For example, a laser may be used to burn away a small amount of material of a sensor, forming a kerf. A kerf may comprise a thickness of a portion of material removed with a laser cut. A kerf may be configured to raising the resistance of a portion of passive circuitry 110 and may permanently alter the frequency response of the response signal from the sensor. Accordingly, if the sensor of the particular entity provides a response signal with the altered frequency response, it may be determined that the sensor is genuine, or that the sensor is a particular sensor within a group of sensors.

In some embodiments, known physical characteristics specific to sensors of a particular entity may be used during interrogation. For example, sensors of a particular entity may have a known and/or designed aging mechanism. As the sensor ages, the sensor may have a frequency shift, which may be differentiated from aging for sensors of other entities. The other entities may not have access to the known and/or designed aging mechanism. Accordingly, if the sensor of the particular entity provides a response signal with the known and/or designed aging mechanism, it may be determined that the sensor is genuine.

FIGS. 5A-5B, 6A-6B, and 7A-7B illustrate the response signal a sensor may provide when the sensor is disposed at different positions relative to an interrogator. Analysis that the interrogator may perform related to various attach vectors based on the response signal is discussed in connection with FIGS. 5A-5B, 6A-6B, and 7A-7B. The angles described in connection with FIGS. 5A-5B, 6A-6B, and 7A-7B are non-limiting example angles provided for illustrative purposes. Refer to FIGS. 3A-3C for variance of threshold angles.

Figure 5A:
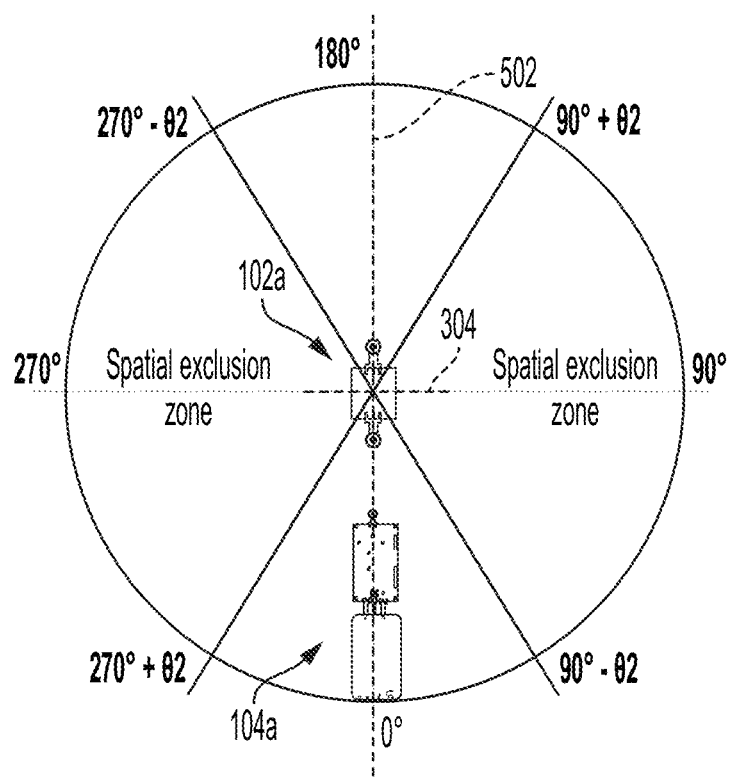
FIG. 5A is a diagram illustrating an operating environment of a passive wireless sensor and an interrogator, in accordance with some embodiments.

FIG. 5A illustrates an operating environment of sensor 102a and interrogator 104a when an attack has not occurred. In FIG. 5A, the antenna axis 302 of sensor 102a is positioned along the zero degree and 180 degree axis. The normal axis 304 of sensor 102a is positioned along the ninety degree and 270 degree axis. An interrogator 104a is positioned at zero degrees.

As discussed above, when an interrogation signal is less than the threshold angle from the normal axis 304, the sensor will provide an even mode response at frequency f1. As the normal axis is positioned along the ninety degree and 270 degree axis, the sensor will provide an even mode response at frequency f1 to interrogation signals received from angles of ninety degrees plus or minus the threshold angle $\theta 2$ and 270 degrees plus or minus the threshold angle $\theta 2$. Where the threshold angle $\theta 2$ is sixty degrees, the sensor will provide an even mode response at frequency f1 to interrogation signals received from angles between thirty degrees and 150 degrees and for angles between 210 degrees and 330 degrees.

As discussed above, when an interrogation signal is greater than the threshold angle from the normal axis 304, the sensor will provide an odd mode response at frequency f2. As the normal axis is positioned along the ninety degree and 270 degree axis, the sensor will provide an even mode response at frequency f1 to interrogation signals received from angles between ninety degrees plus threshold angle $\theta 2$ and 270 degrees minus the threshold angle $\theta 2$ and angles between 270 degrees plus the threshold angle $\theta 2$ and ninety degrees minus threshold angle $\theta 2$. Where the threshold angle $\theta 2$ is sixty degrees, the sensor will provide an even mode response at frequency f1 to interrogation signals received from angles between 150 degrees and 210 degrees and for angles between 330 degrees and thirty degrees.

As illustrated in FIG. 5A, where the sensor 120a is initially installed with a position relative to interrogator 104a that provides an odd mode response, a zone where the sensor will provide an even mode response may be referred to as a spatial exclusion zone. In an alternative embodiment not illustrated, where the sensor 120a is initially installed with a position relative to interrogator 104a that provides an even mode response, a zone where the sensor will provide an odd mode response may be referred to as a spatial exclusion zone.

Interrogator 104a provides an interrogation signal to sensor 102a along an interrogation direction 502. Sensor 102a has been installed such that the relative angle between interrogation direction 502 and the normal 304 axis of sensor 102a is greater than the threshold angle. The sensor 102a provides an odd mode response to the interrogator 104a. Using the odd mode response from sensor 102a, the interrogator 104a determines that a position of the interrogation direction is between 150 degrees and 210 degrees or between 330 degrees and thirty degrees. The interrogator 104a knows the installed position of the sensor 102a has the interrogation direction arranged at zero degrees. The interrogator 104a compares the determined position range of the sensor and the known installed position of the sensor. In FIG. 5A, the interrogator 104a determines that the known installed position of the sensor falls within the determined position range of the sensor 102a. The interrogator 102a may then determine that no attack has occurred because the position of the sensor 102a and the interrogation direction has not changed more than a threshold amount, for example, not changed to fall within the threshold angle of sixty degrees.

Figure 5B:
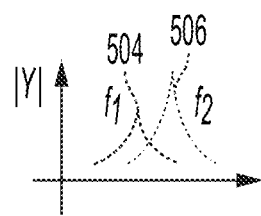
FIG. 5B is a plot illustrating frequency response of a passive wireless sensor of FIG. 5A, in accordance with some embodiments.

FIG. 5B illustrates frequency response of the sensor 102a of FIG. 5A. In FIG. 5A, sensor 102a provides a response with odd mode response 506 at frequency f2 having a greater amplitude than even mode response 504 at frequency f1.

Figure 6A:
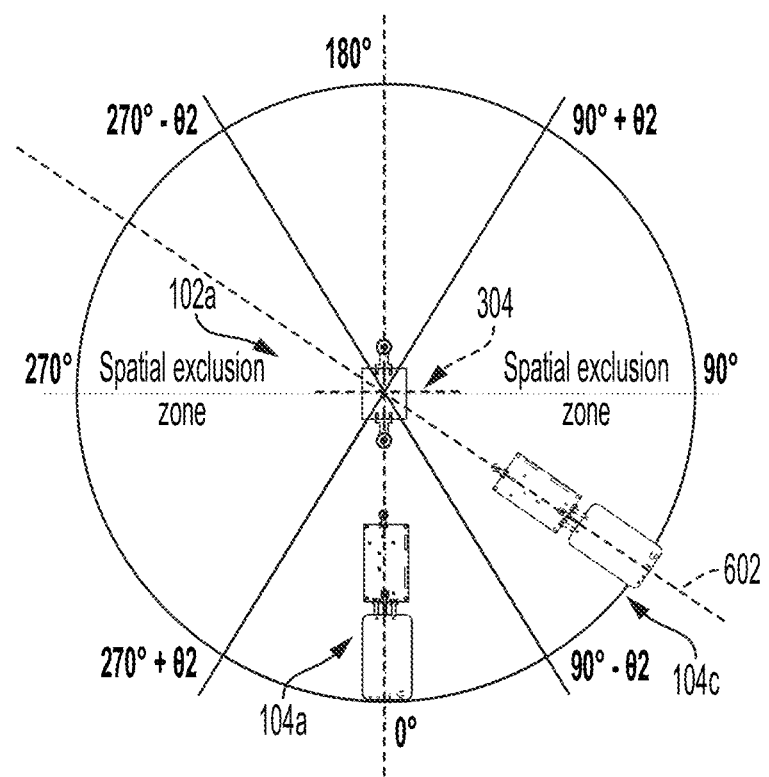
FIG. 6A is a diagram illustrating an operating environment of a passive wireless sensor and an interrogator, in accordance with some embodiments.

FIG. 6A illustrates an operating environment of sensor 102a and interrogator 104a when an attack has occurred. In FIG. 6A, the antenna axis 302 of sensor 102a is positioned along the zero degree and 180 degree axis. The normal axis 304 of sensor 102a is positioned along the ninety degree and 270 degree axis. An interrogator 104a is positioned at zero degrees. A malicious interrogator 104c is positioned in the spatial exclusion zone, for example at forty-five degrees, which is fifteen degrees from the normal axis 304. To perform the attack, the malicious interrogator 104c interrogates the sensor 102a, and replays a response received from sensor 102a to interrogator 102a, which may be referred to as a replay attack.

Interrogator 104c provides an interrogation signal to sensor 102a along an interrogation direction 602. Sensor 102a has been installed such that the relative angle between interrogation direction 602 and the normal axis 304 of sensor 102a is less than the threshold angle. The sensor 102a provides an even mode response to the malicious interrogator 104c, which replays the even mode response to the interrogator 104a. Using the even mode response from sensor 102a, the interrogator 104a determines that a position of the interrogation direction between thirty degrees and 150 degrees or between 210 degrees and 330 degrees. The interrogator 104a knows the installed position of the sensor 102a has the interrogation direction arranged at zero degrees. The interrogator 104a compares the determined position range of the sensor and the known installed position of the sensor. In FIG. 6A, the interrogator 104a determines that the known installed position of the sensor falls outside the determined position range of the sensor 102a. The interrogator 102a may then determine that an attack has occurred because the position of the sensor 102a and the interrogation direction has changed more than a threshold amount, for example, changed to fall within the threshold angle of sixty degrees. In response to determining that an attack has occurred the interrogator 104a may trigger an alert indicating that a spoofing attack, such as at least one of a counterfeit attack, tampering attack, or a replay attack has occurred.

Figure 6B:
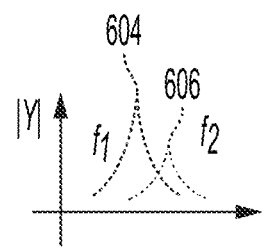
FIG. 6B is a plot illustrating frequency response of a passive wireless sensor of FIG. 6A, in accordance with some embodiments.

FIG. 6B illustrates frequency response of the sensor 102a of FIG. 6A. In FIG. 6A, sensor 102a provides a response with even mode response 604 at frequency f1 having a greater amplitude than odd mode response 606 at frequency f2.

Figure 7A:
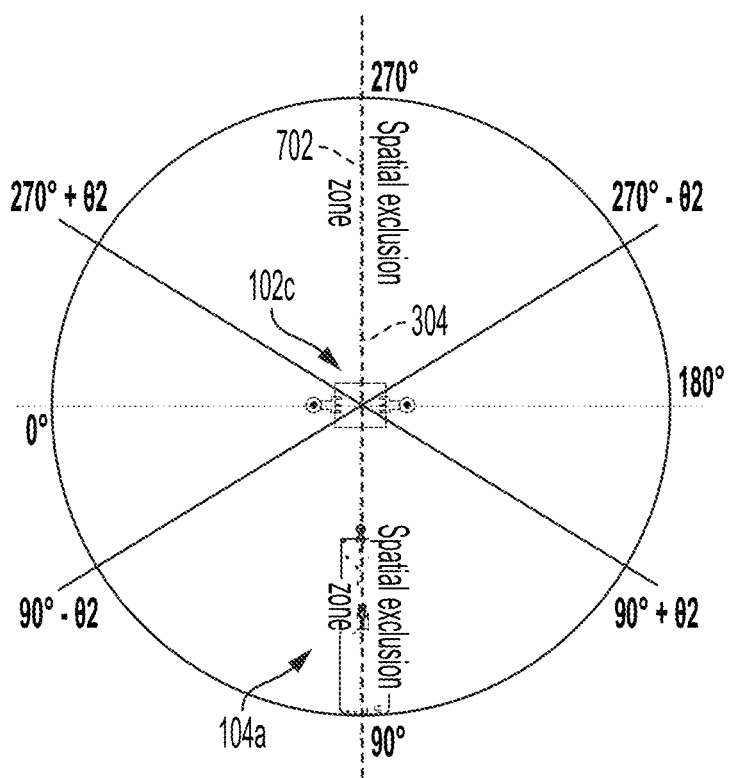
FIG. 7A is a diagram illustrating an operating environment of a passive wireless sensor and an interrogator, in accordance with some embodiments.

FIG. 7A illustrates an operating environment of sensor 102a and interrogator 104a when an attack has occurred. In FIG. 7A, the antenna axis 302 of a malicious sensor 102c is positioned along the zero degree and 180 degree axis. The normal axis 304 of the malicious sensor 102a is positioned along the ninety degree and 270 degree axis. An interrogator 104a is positioned at ninety degrees, as malicious sensor 102c is rotated ninety degrees relative to the sensor 102a it replaced. To perform the attack, sensor 102a is replaced with the malicious sensor 102c, which may be referred to as a counterfeit attack. Alternatively, to perform the attack, sensor 102a is repositioned and becomes malicious sensor 102c, which may be referred to as a tampering attack.

Interrogator 104a provides an interrogation signal to malicious sensor 102c along an interrogation direction 702. Malicious sensor 102c has been installed such that the relative angle between interrogation direction 702 and the normal 304 axis of malicious sensor 102c is less than the threshold angle. The malicious sensor 102c provides an even mode response to the interrogator 104a. Using the even mode response from malicious sensor 102c, the interrogator 104a determines that a position of the interrogation direction between thirty degrees and 150 degrees or between 210 degrees and 330 degrees. The interrogator 104a knows the installed position of the sensor 102a has the interrogation direction arranged at zero degrees. The interrogator 104a compares the determined position range of the sensor and the known installed position of the sensor. In FIG. 7A, the interrogator 104a determines that the known installed position of the sensor falls outside the determined position range of the sensor 102a. The interrogator 102a may then determine that an attack has occurred because the position of the sensor 102a and the interrogation direction has changed more than a threshold amount, for example, changed to fall within the threshold angle of sixty degrees. In response to determining that an attack has occurred the interrogator 104a may trigger an alert indicating that a spoofing attack, such as at least one of a counterfeit attack, tampering attack, or a replay attack has occurred.

Figure 7B:
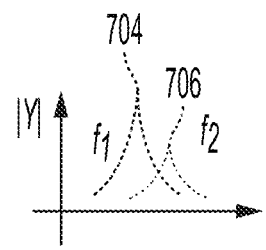
FIG. 7B is a plot illustrating frequency response of a passive wireless sensor of FIG. 7A, in accordance with some embodiments.

FIG. 7B illustrates frequency response of the malicious sensor 102c of FIG. 7A. In FIG. 7A, malicious sensor 102c provides a response with even mode response 704 at frequency f1 having a greater amplitude than odd mode response 706 at frequency f2.

Figure 10:
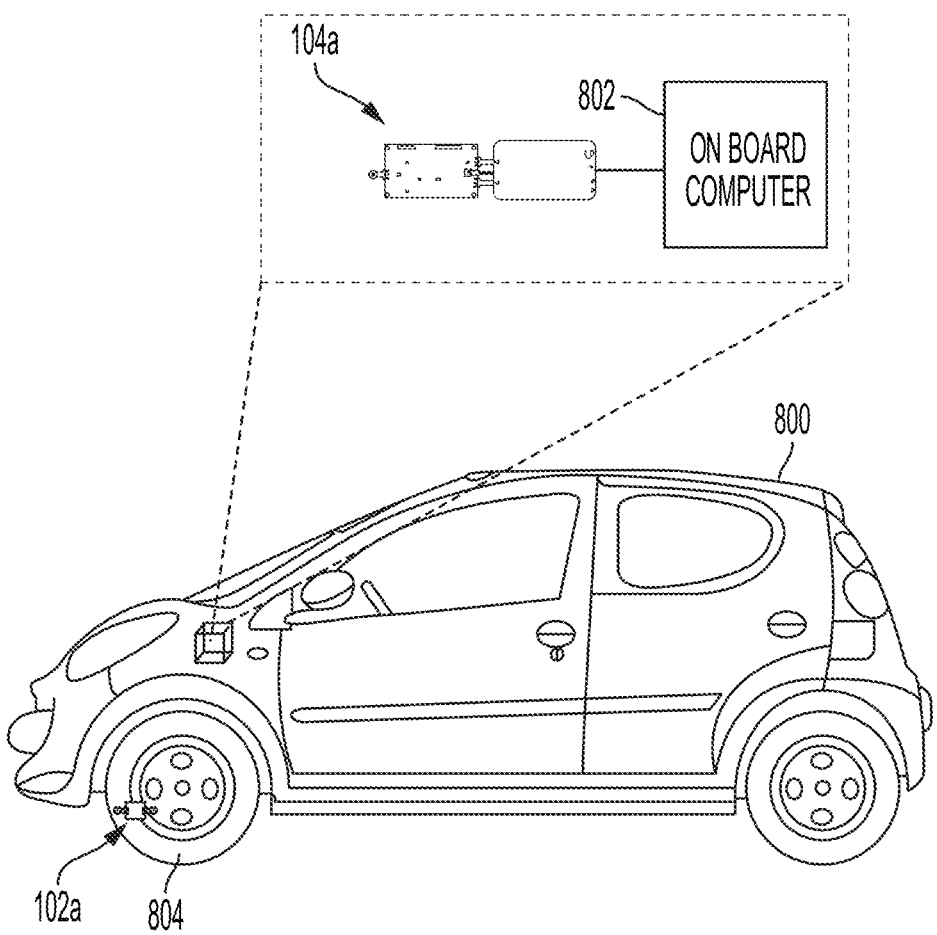
FIG. 10 is a diagram illustrating an operating environment of a passive wireless sensor and an interrogator, in accordance with some embodiments.

FIG. 10 illustrates a non-limiting example in which at least one interrogator, such as interrogator 104a or 104b, and at least one sensor, such as sensor 102a or sensor 102b, of the types described herein is employed in a vehicle. In the example of FIG. 10, a vehicle 1000 includes an on board computer 1002 of the vehicle 1000 coupled to the interrogator 104a by a wired or wireless connection. As a non-limiting example, the vehicle 1000 further includes a vehicle component, such as tire 1004, and a sensor 102a disposed at the sensor. The sensor 102a may be disposed in the tire 1004. The sensor 102a may sense a characteristic of the tire, such as a pressure of temperature of the tire. The sensor may be configured to transmit the pressure or temperature information of the tire as well as position information of the sensor 102a to the interrogator. The interrogator 104a may receive power and control signals from the on board computer 1002 and may supply output signals of the type described herein to the on board computer 1002

Figure 11:
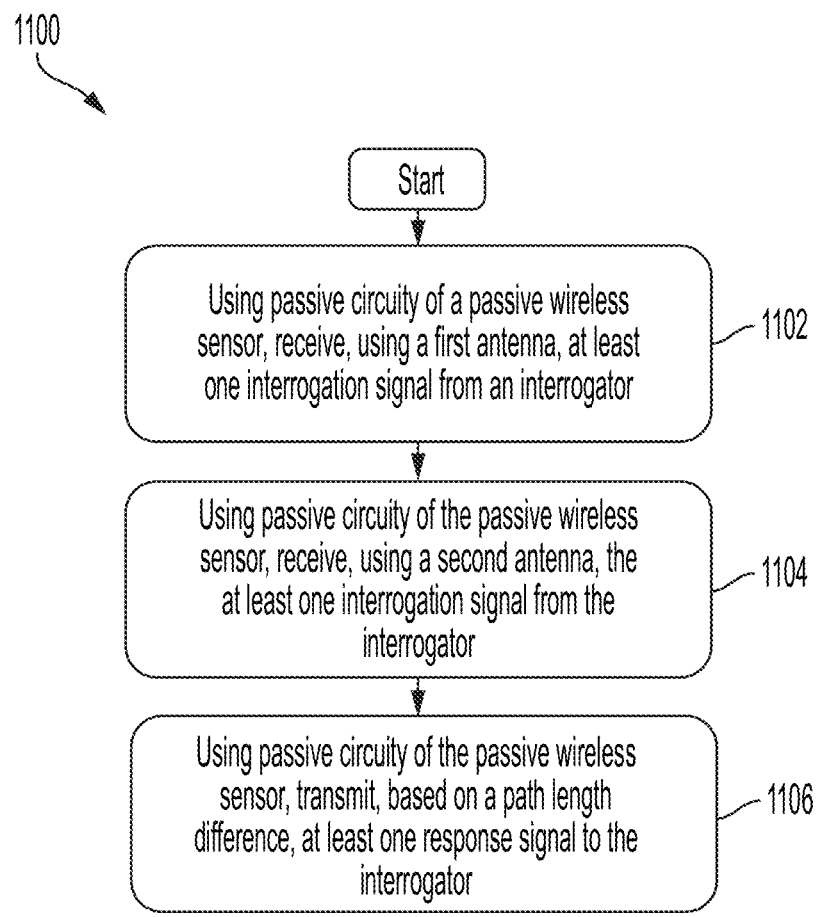
FIG. 11 is a process flow diagram of a method performed by a passive wireless sensor, in accordance with some embodiments

FIG. 11 shows a process 1100 that may be performed by a passive wireless sensor such as sensor 102a. Process 1100 includes steps 1102, 1104, 1106. In step 1102, the sensor, using passive circuitry, receives, using a first antenna, at least one interrogation signal from an interrogator. In step 1104, the sensor, using passive circuitry of the passive wireless sensor, receives, using a second antenna, the at least one interrogation signal from the interrogator. There is a path length difference between the at least one interrogation signal received using the first antenna and the at least one interrogation signal received using the second antenna. In step 1106, the sensor, using passive circuitry of the passive wireless sensor, transmits, based on the path length difference, at least one response signal to the interrogator.

Figure 12:
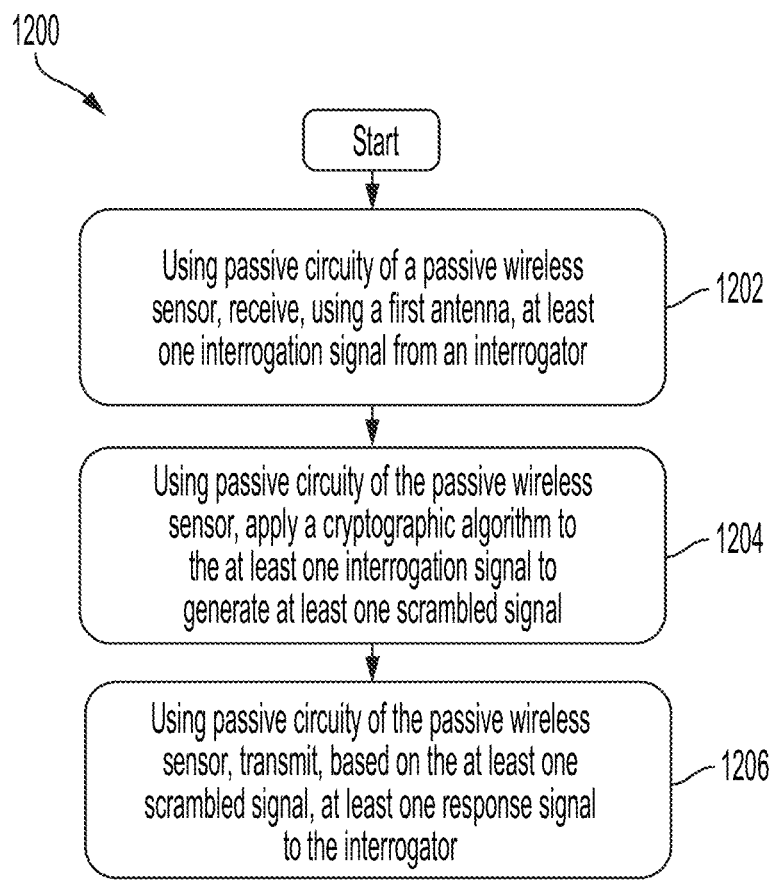
FIG. 12 is a process flow diagram of a method performed by a passive wireless sensor, in accordance with some embodiments

FIG. 12 shows a process 1200 that may be performed by a passive wireless sensor such as sensor 102a. Process 1200 includes steps 1202, 1204, and 1206. In step 1202, the sensor, using passive circuitry of a passive wireless sensor, receives, using a first antenna, at least one interrogation signal from an interrogator. In step 1204, the sensor, using passive circuitry of the passive wireless sensor, applies a cryptographic algorithm to the at least one interrogation signal to generate at least one scrambled signal. In step 1206, the sensor, using passive circuitry of the passive wireless sensor, transmits, based on the at least one scrambled signal, at least one response signal to the interrogator.

Figure 13:
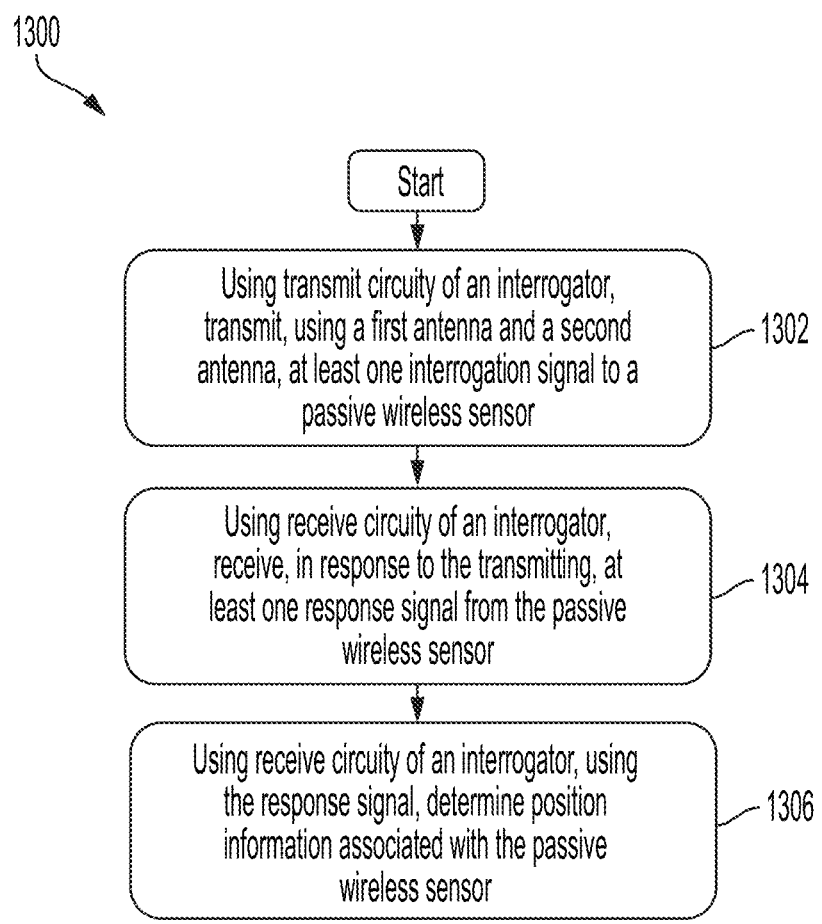
FIG. 13 is a process flow diagram of a method performed by an interrogator, in accordance with some embodiments.

FIG. 13 shows a process 1300 that may be performed by an interrogator such as interrogator 104b. Process 1300 includes steps 1302, 1304, and 1306. In step 1302, the interrogator, using transmit circuitry of an interrogator, transmits, using a first antenna and a second antenna, at least one interrogation signal to a passive wireless sensor. In step 1304, the interrogator, using receive circuitry of an interrogator, receives, in response to the transmitting, at least one response signal from the passive wireless sensor. In step 1306, the interrogator, using receive circuitry of an interrogator, using the response signal, determines position information associated with the passive wireless sensor.

Examples of arrangements that may be implemented according to some embodiments include the following:

Example 1

A passive wireless sensor configured to wirelessly couple with an interrogator, comprising:
a first antenna; and
passive circuitry configured to:
receive, using the first antenna, at least one interrogation signal from the interrogator;
apply a cryptographic algorithm to the at least one interrogation signal to generate at least one scrambled signal; and
transmit, based on the at least one scrambled signal, at least one response signal to the interrogator.

Example 2

An interrogator configured to wirelessly couple with a passive wireless sensor, the interrogator comprising:
a first antenna;
a second antenna;
transmit circuitry configured to transmit, using the first antenna and the second antenna, at least one interrogation signal to the passive wireless sensor; and
receive circuitry configured to:
receive, in response to the transmitting, at least one response signal from the passive wireless sensor;
using the response signal, determine position information associated with the passive wireless sensor.

Various aspects of the present application may provide one or more benefits. Some examples are now listed. It should be appreciated that not all aspects necessarily provide all benefits and benefits other than those listed may be provided by one or more aspects. According to some aspects of the present application, a secure system of interrogators and sensors, such as the temperature of pressure SAW sensors, is provided. The secure system may provide security against spoofing attacks such as replay attacks, counterfeit attacks, or tampering attacks, as well as security against sniffing attacks. In some embodiments, the secure system may be particularly beneficial in vehicle or industrial environments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A passive wireless sensor configured to wirelessly couple with an interrogator, the passive wireless sensor comprising:
   a first antenna;
   a second antenna;
   passive circuitry configured to:
      receive, using the first antenna and the second antenna, at least one interrogation signal from the interrogator, comprising:
         receiving, using the first antenna, the at least one interrogation signal; and
         receiving, using the second antenna, the at least one interrogation signal, wherein there is a path length difference between the at least one interrogation signal received using the first antenna and the at least one interrogation signal received using the second antenna; and
      transmit, based on the at least one interrogation signal, at least one response signal to the interrogator, comprising transmitting, based on the path length difference, the at least one response signal to the interrogator,
      wherein the at least one response signal comprises position information associated with the passive wireless sensor.

2. The sensor of claim 1, wherein the passive circuitry is further configured to:
   calculate the path length difference between the at least one interrogation signal received using the first antenna and the at least one interrogation signal received using the second antenna; and
   determine whether the calculated path length difference exceeds a threshold path length difference.

3. The sensor of claim 2, wherein the passive circuitry configured to transmit, based on the at least one interrogation signal, the at least one response signal to the interrogator is configured to transmit, based on the calculated path length difference, the at least one response signal.

4. The sensor of claim 3, wherein the passive circuitry configured to transmit, based on the calculated path length difference, the at least one response signal is configured to:
in response to determining that the calculated path length difference does not exceed the threshold path length difference, transmit the at least one response signal comprising the position information, wherein the position information indicates that the passive wireless sensor has not moved more than a threshold amount; and
in response to determining that the calculated path length difference exceeds the threshold path length difference, transmit the at least one response signal comprising the position information, wherein the position information indicates that the passive wireless sensor has moved more than the threshold amount.

5. The sensor of claim 4, wherein the threshold amount comprises a threshold angle.

6. The sensor of claim 5, wherein the threshold angle is approximately 60 degrees.

7. The sensor of claim 1, wherein the first antenna is disposed approximately $5\lambda/8$ from the second antenna, wherein $\lambda$ is a wavelength of the at least one interrogation signal.

8. A passive wireless sensing system, the system comprising:
a component;
an interrogator; and
a passive wireless sensor disposed at the component and configured to wirelessly couple with the interrogator, the passive wireless sensor comprising:
a first antenna;
a second antenna;
passive circuitry configured to:
receive, using the first antenna and the second antenna, at least one interrogation signal from the interrogator, comprising:
receiving, using the first antenna, the at least one interrogation signal; and
receiving, using the second antenna, the at least one interrogation signal, wherein there is a path length difference between the at least one interrogation signal received using the first antenna and the at least one interrogation signal received using the second antenna; and
transmit, based on the at least one interrogation signal, at least one response signal to the interrogator, comprising transmitting, based on the path length difference, the at least one response signal to the interrogator,
wherein the at least one response signal comprises position information associated with the passive wireless sensor.

9. The system of claim 8, wherein the interrogator comprises:
a third antenna;
transmit circuitry configured to transmit, using the third antenna, the at least one interrogation signal to the passive wireless sensor; and
receive circuitry configured to:
receive, in response to the transmitting of the at least one interrogation signal, the at least one response signal from the passive wireless sensor; and
use the at least one response signal to determine position information associated with the passive wireless sensor.

10. The system of claim 8, comprising a vehicle, wherein the component comprises a component of the vehicle.

11. The system of claim 10, wherein:
the passive wireless sensor is configured to measure characteristic information of the component; and
the passive circuitry configured to transmit, based on the at least one interrogation signal, the at least one response signal to the interrogator is configured to transmit the at least one response signal comprising the characteristic information of the component.

12. The system of claim 11, wherein:
the component comprises a tire;
the characteristic information comprises at least one of pressure information or temperature information.

13. The system of claim 8, wherein the passive circuitry configured to receive, using the first antenna and the second antenna, the at least one interrogation signal from the interrogator and transmit, based on the at least one interrogation signal, the at least one response signal to the interrogator is configured to:
calculate the path length difference between the at least one interrogation signal received using the first antenna and the at least one interrogation signal received using the second antenna;
determine whether the calculated path length difference exceeds a threshold path length difference; and
transmit, based on the calculated path length difference, the at least one response signal.

14. A method of passive wireless sensing, the method comprising:
using passive circuitry of a passive wireless sensor for:
receiving, using a first antenna, at least one interrogation signal from an interrogator;
receiving, using a second antenna, the at least one interrogation signal from the interrogator, wherein there is a path length difference between the at least one interrogation signal received using the first antenna and the at least one interrogation signal received using the second antenna; and
transmitting, based on the path length difference, at least one response signal to the interrogator.

15. The method of claim 14, wherein transmitting, based on the path length difference, the at least one response signal to the interrogator comprises transmitting the at least one response signal comprising position information associated with the passive wireless sensor.

16. The method of claim 15, further comprising, using the passive circuitry for:
calculating the path length difference between the at least one interrogation signal received using the first antenna and the at least one interrogation signal received using the second antenna; and
determining whether the calculated path length difference exceeds a threshold path length difference.

17. The method of claim 16, wherein transmitting, based on the path length difference, the at least one response signal comprises:
in response to determining that the calculated path length difference does not exceed the threshold path length difference, transmit the at least one response signal comprising the position information, wherein the position information indicates that the passive wireless sensor has not moved more than a threshold amount; and
in response to determining that the calculated path length difference does exceed the threshold path length difference, transmit the at least one response signal comprising the position information, wherein the position information indicates that the passive wireless sensor has moved more than the threshold amount.

18. The method of claim 17, further comprising, using the interrogator, in response to receiving the at least one response signal comprising the position information, wherein the position information indicates that the passive wireless sensor has moved more than the threshold amount, for triggering an alert indicating that at least one of a counterfeit attack, a tampering attack, or a replay attack has occurred.

19. The method of claim 17, wherein the threshold amount comprises a threshold angle.

* * * * *